(12) United States Patent
Choi et al.

(10) Patent No.: US 9,354,996 B2
(45) Date of Patent: *May 31, 2016

(54) SYSTEM TEST APPARATUS

(75) Inventors: Byoung Ju Choi, Seoul (KR); Joo Young Seo, Seoul (KR); Sueng Wan Yang, Gyeonggi-do (KR); Jin Yong Lim, Gyeonggi-do (KR); Young Su Kim, Gyeonggi-do (KR); Jung Suk Oh, Gyeonggi-do (KR); Hae Young Kwon, Gyeonggi-do (KR); Seung Yeun Jang, Gyeonggi-do (KR)

(73) Assignees: Hyundai Motor Company, Seoul (KR); Kia Motors Corporation, Seoul (KR); Ehwa University Industry Collaboration Foundation, Seoul (KR)

( * ) Notice: Subject to any disclaimer, the term of this patent is extended or adjusted under 35 U.S.C. 154(b) by 330 days.

This patent is subject to a terminal disclaimer.

(21) Appl. No.: 13/704,490

(22) PCT Filed: Mar. 15, 2011

(86) PCT No.: PCT/KR2011/001803
§ 371 (c)(1),
(2), (4) Date: Dec. 14, 2012

(87) PCT Pub. No.: WO2012/002635
PCT Pub. Date: Jan. 5, 2012

(65) Prior Publication Data
US 2013/0086425 A1    Apr. 4, 2013

(30) Foreign Application Priority Data

Jun. 28, 2010  (KR) .................. 10-2010-0061455
Sep. 7, 2010   (WO) ................ PCT/KR2010/006068

(51) Int. Cl.
*G06F 11/26*  (2006.01)
*G06F 11/36*  (2006.01)

(52) U.S. Cl.
CPC ............ *G06F 11/26* (2013.01); *G06F 11/3636* (2013.01)

(58) Field of Classification Search
CPC ............ G06F 11/3668; G06F 11/3644; G06F 11/3688; G06F 11/3696
USPC .......................................................... 714/35
See application file for complete search history.

(56) References Cited

U.S. PATENT DOCUMENTS 6,175,916 B1    1/2001  Ginsberg et al.
2006/0218446 A1  9/2006  Crawford (Continued)

FOREIGN PATENT DOCUMENTS

EP    1 172 729    1/2002
EP    2 587 379    1/2013

(Continued)

OTHER PUBLICATIONS

Anonymous, "strace(1)—Linux manual page" Mar. 30, 2010, pp. 1-10.

(Continued)

*Primary Examiner* — Jigar Patel
(74) *Attorney, Agent, or Firm* — Mintz Levin Cohn Ferris Glovsky and Popeo, P.C.; Peter F. Corless

(57) ABSTRACT

The present invention relates to a system test apparatus. The system test apparatus includes an insertion module configured to insert a test agent into a process control block, a hooking module configured to hook a test target to a test code using the test agent when an event related to the test target occurs, a scanning module configured to collect pieces of test information about a process in which the event related to the test target has occurred when the test target is hooked, and a logging module configured to store the pieces of test information collected by the scanning module.

20 Claims, 6 Drawing Sheets

(56) References Cited

U.S. PATENT DOCUMENTS

| | | | |
|---|---|---|---|
| 2007/0074175 | A1 | 3/2007 | Bengtsson et al. |
| 2007/0234295 | A1* | 10/2007 | Dufour et al. .............. 717/124 |
| 2008/0209443 | A1 | 8/2008 | Suzuki |
| 2008/0222375 | A1 | 9/2008 | Kotsovinos et al. |
| 2009/0089622 | A1 | 4/2009 | Qi et al. |
| 2009/0249368 | A1 | 10/2009 | Needamangala et al. |

FOREIGN PATENT DOCUMENTS

| | | |
|---|---|---|
| EP | 2615552 A1 | 7/2013 |
| JP | H04286035 | 10/1992 |
| JP | H10269105 | 10/1998 |
| JP | H10269110 | 10/1998 |
| JP | 2001318805 | 11/2001 |
| JP | 2006277115 | 10/2006 |
| JP | 2009265823 | 11/2009 |
| KR | 20030041612 | 5/2003 |
| KR | 10-2004-0087767 | 10/2004 |
| KR | 20060102479 | 9/2006 |
| KR | 10-2007-0087400 | 8/2007 |
| KR | 10-2008-0048035 | 5/2008 |
| KR | 20080079343 | 9/2008 |
| KR | 20090001897 | 1/2009 |
| KR | 20090081749 | 7/2009 |
| KR | 10-2009-0083623 | 8/2009 |
| WO | 2007-039486 A2 | 4/2007 |

OTHER PUBLICATIONS

Seo, J. et al. "A profiling method by PCB hooking and its application for memory fault detection in embedded system operational test", Information and Software Technology, 53 (2011) pp. 106-119.
International Search Report mailed Oct. 25, 2011 in PCT/KR/2011/001803.
Tanenbaum, "Modern Operating Systems", 3rd Edition, Processes and Threads, Chapter 2, Sec 2.1, pp. 88-91, XP055124484.
Asberg et al., "Execution Time Monitoring in Linux", Emerging Technologies & Factory Automation, 2009, ETFA 2009, IEEE Conference, pp. 1-4, XP031575806.
Kuster, "Three Ways to Inject Your Code into Another Process", Aug. 20, 2003, XP055084724, URL:http://www.codeproject.com.
Bovet et al., "Linux Kernel", O'Reilly Japan O'Reilly Team, Mar. 30, 2007, first Edition, pp. 89-95.
Akita, "Use of Various Trace Tools", Open Source Magazine, Sep. 1, 2006, vol. 15, Issue 9, pp. 109-118.
Russinovich et al., "Windows NT System-Call Hooking", Dr. Dobbs Journal, May 1, 1997, vol. 6, Issue 6, pp. 39-44.
Wakabayashi et al., "Overview of ITRON Debugging Interface and Evaluation of its Adaptabililty", Computer System Symposium 2000, Nov. 15, 2000, vol. 2000, Issue 13, pp. 53-60.
Hirotaka et al., "Debug Hacks", O'Reilly Japan O'Reilly Team, Jun. 12, 2009, first Edition, pp. 140-143.
Bird et al., CE Linux optimized for Electronic Appliances for a Consumer (sequel), CQ Publishing Company, Aug. 1, 2005, vol. 31, Issue 8, pp. 165-174.

* cited by examiner

SYSTEM TEST APPARATUS

TECHNICAL FIELD

The present invention relates to a system test apparatus, and more particularly, to a system test apparatus for collecting pieces of information about a test for a system in real time using a process control block including information about the execution of the system.

BACKGROUND ART

In an embedded system including various pieces of software and hardware, interoperability is important in an environment in which systems operate. Accordingly, not virtual data for a test including only software, but an operation using real data obtained in a live environment in which a system operates really is important. If it is sought to test a system, there is a need for a scheme capable of effectively detecting a potential defect or an operational defect occurring when the system operates really by performing a test for the system using real operation data.

Furthermore, in order to independently test pieces of software that form a system, a lot of test resources and costs are necessary because additional equipment for replacing a counterpart component must be used. Accordingly, there is a need for a test apparatus, which can test all processes included in a system in real time and minimize memory space overhead or performance overhead due to the execution of a corresponding code.

DISCLOSURE

Technical Problem

An embodiment of the present invention is directed to providing a system test apparatus which is capable of testing an actually operating system, performing a dynamic test even in the run-time conditions of a system, and checking a defect occurring while a system operates, by performing a memory error test, a performance test, and a test for communication between processes for a system using hooking technology.

Technical Solution

In an aspect, the present invention relates to a system test apparatus. The system test apparatus includes an insertion module configured to insert a test agent into a process control block, a hooking module configured to hook a test target to a test code using the test agent when an event related to the test target occurs, a scanning module configured to collect pieces of test information about a process in which the event related to the test target has occurred when the test target is hooked is hooked to the test code, and a logging module configured to store the pieces of test information collected by the scanning module.

In another aspect, the present invention relates to a system test system. The system test system includes an input apparatus configured to receive a signal for driving a system, a system test apparatus configured to insert a test agent into a process control block, hook a test target to a test code using the test agent, and collect pieces of test information about a process in which an event related to the test target has occurred, from among a plurality of processes, while the system operates in response to the signal received through the input apparatus, and an analysis apparatus configured to analyze the pieces of test information collected by the system test apparatus.

Advantageous Effects

In accordance with the present invention, a test for a system can be performed while the system operates actually because not a source code, but an actually operated code is used as a target. Accordingly, a memory error, system performance, and communication between processes can be tested while a system operates actually.

Furthermore, system overhead can be minimized and a test for a system can be performed without interrupting the system because a hooking method of utilizing information included in a process control block is used without inserting an individual code into each process.

Furthermore, although shared resources between processes are limited, pieces of information about a test can be collected in real time and a result of the test can be checked based on the pieces of information.

MODE FOR INVENTION

The present invention relates to a test in an environment in which a system operates actually and to an apparatus and method which can test a system in a dynamic situation from the start of the system to the end of the system. The present invention can perform a test for all processes which operate within a system using a hooking scheme.

Figure 1:
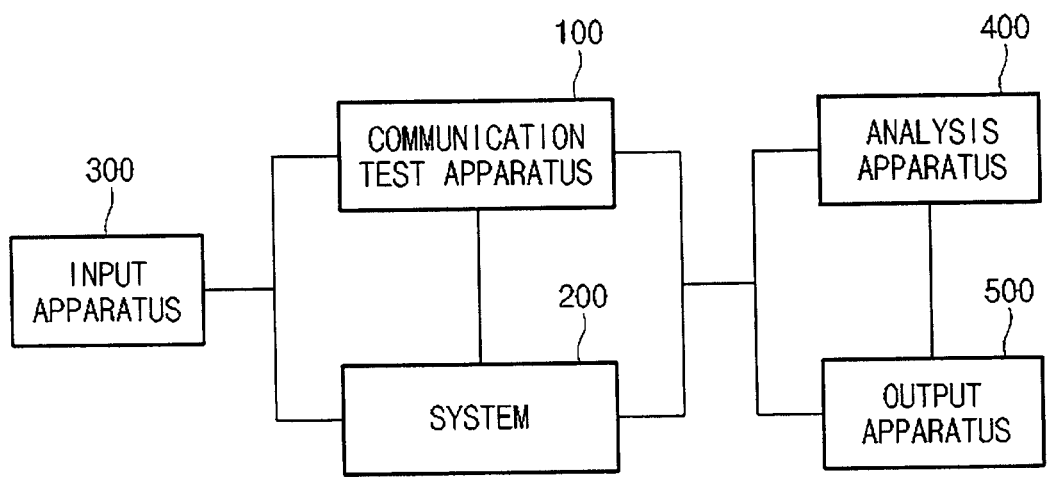
FIG. 1 is a diagram showing the entire system in which a system test apparatus according to an embodiment of the present invention is used.

FIG. 1 is a diagram showing the entire system in which a system test apparatus according to an embodiment of the present invention is used.

As shown in FIG. 1, the entire system includes a system test apparatus 100, a system 200, an input apparatus 300, an analysis apparatus 400, and an output apparatus 500.

The system test apparatus 100 is configured to test a memory defect for the system 200, the performance of the system 200, or communication between two or more processes included in the system 200. The system test apparatus 100 may be provided independently from the system 200, as shown in FIG. 1, or may be implemented in a form that the communication test apparatus 100 is included in the system 200.

The system 200 is a test target of the system test apparatus 100. The system 200 is an embedded system in which various pieces of software and hardware are integrated. The system, that is, a test target of the system test apparatus 100, refers to one or more systems including a plurality of processes. Accordingly, a memory defect or system performance in a plurality of systems may become the test target of the system test apparatus 100, and not only communication between a plurality of processes included in one system, but also communication between processes included in different systems may become a test target of the system test apparatus 100.

The system 200 may include all embedded systems and computer systems in which multiple processes perform communication one another and may become, for example, an infotainment system, a multimedia system, or a wired/wireless network system. For example, if the system 200 is a vehicle infotainment system, the system 200 may include Terrestrial Digital Multimedia Broadcasting (TDMB), Transport Protocol Expert Group (TPEG), IPOD, USB, Bluetooth, Voice Recognition (VR), a Parking Guidance System (PGS), a Radio Data System (RDS), Vehicle CDC (VCDC), a Driver Information System (DIS), Rear Seat Entertainment (RSE), a Hybrid Electric Vehicle (HEV) display, and an Air Handling Unit (AHU) display on the basis of an Audio Video Navigation (AVN) function.

The input apparatus 300 is a user input apparatus for driving the system test apparatus 100 and the system 200. The input apparatus 300 may be implemented using a keyboard or a touch screen. The system 200 is driven in response to a signal received through the input apparatus 300. Furthermore, the system test apparatus 100 executes an operation for a system test in response to a signal received through the input apparatus 300.

The analysis apparatus 400 analyzes pieces of test information collected by the system test apparatus 100 and checks a result of a test for the system 200. The system test apparatus 100, together with the analysis apparatus 400, may be integrated into one apparatus. In this case, the system test apparatus 100 may check a result of a test by collecting pieces of test information and, at the same time, analyzing the pieces of collected test information.

The output apparatus 500 outputs the pieces of test information collected by the system test apparatus 100 or a result of the test analyzed by the analysis apparatus 400 in the form of an image or voice. A user who uses the output apparatus 500 may check a result of the test for the system 200.

Figure 2:
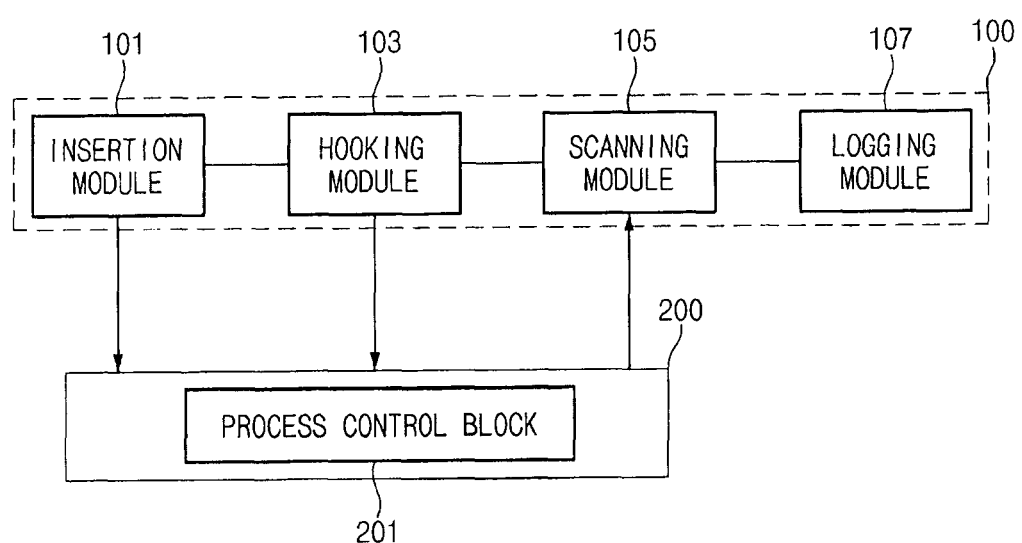
FIG. 2 shows the construction of the system test apparatus according to an embodiment of the present invention.

FIG. 2 shows the construction of the system test apparatus 100 according to an embodiment of the present invention.

As shown in FIG. 2, the system test apparatus 100 includes an insertion module 101, a hooking module 103, a scanning module 105, and a logging module 107. In FIG. 2, it is assumed that the system 200, that is, a test target, connected to the system test apparatus 100 is a single system including two or more processes.

The system 200 includes a process control block 201. The process control block 201 includes run-time execution information about all processes included in the system 200. The run-time execution information means execution information between all the processes while the system 200 operates. Accordingly, the process control block 201 may include the present state of resource use, a process state, order of priority, and a function table for all the processes included in the system 200. More particularly, the process control block 201 may include a process ID, a process name, a current process, a current thread, a list of processes being executed in the system 200, a list of modules, a system page size, an available physical memory size, CPU usage, a list of resources being used, an I/O apparatus state being requested, information about an opened file, and information about registers. Accordingly, a data structure or apparatus including the above-described information in all systems corresponds to the process control block of the present invention.

The insertion module 101 inserts a test agent into the process control block 201. The test agent may hook a test target to a test code based on information included in the process control block 201 and collect pieces of test information. A test position to which the test code is hooked may be defined depending on the type of detect. In the present invention, the test target hooked to the test code may be a memory region, that is, the test target, a code including information about the performance of a system, or a code that generates a communication-related event. In the present invention, the system 200 operates normally before the test agent is inserted into the process control block 201. The system 200 operates normally without being influenced by the operation of the system test apparatus 100.

Furthermore, the insertion module 101 may check a list of processes that are operating in the system 200 and insert the test agent into the process control block 201 based on the checked list.

The hooking module 103 hooks the test target to a test code using the test agent inserted by the insertion module 101. The test code is changed depending on a target to be tested and the type of detect. That is, the test code is different depending on a memory defect test, a performance test, and a communication test. Even in the communication test, the test code may be different depending on the type of detect to be tested. Furthermore, the hooking module 103 may change a test position to which the test code is hooked.

The term 'being hooked to the test code' means that when an event related to a test target occurs within the system 200 operating now, an inserted test agent hooks the process control block of an OS so that a test code including the operation of an original code is executed. The hooking module 103 may check whether an event related to the test target occurs or not based on information included in the process control block.

The scanning module 105 collects pieces of test information about a process in which an event related to the test target has occurred when the test code is hooked. Here, the pieces of test information may include not only information about an already generated event, but also information about an event newly occurring according to the hooking of a test code. The pieces of collected test information are different depending on a test step, a test object, and the type of detect to be tested.

Accordingly, the scanning module 105 collects pieces of information about the dynamic state of the system that are necessary to analyze a result of a system test, such as a function parameter and return value, a performance measurement value, and a shared resource use list.

The logging module 107 stores the pieces of test information, collected by the scanning module 105, in a storage space. The storage space may be included in the logging module 107 or may be implemented using a device which is different from the logging module 107.

The analysis apparatus 400 of FIG. 1 may analyze the pieces of test information collected by the scanning module 105 or the pieces of test information stored by the logging module 107.

Figure 3:
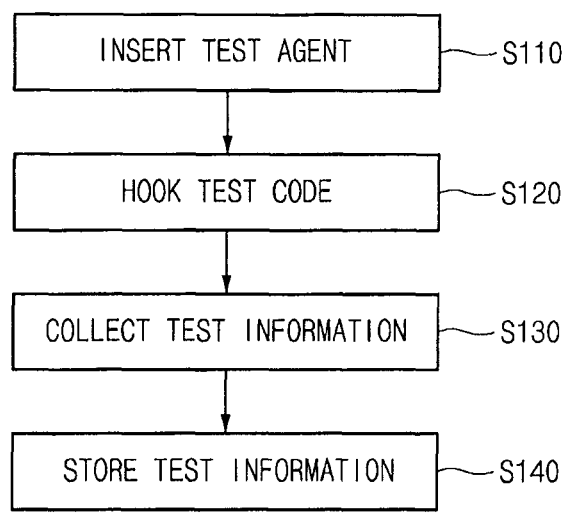
FIG. 3 is a flowchart illustrating a system test method according to an embodiment of the present invention.

FIG. 3 is a flowchart illustrating a system test method according to an embodiment of the present invention.

As shown in FIG. 3, a test agent is inserted into the process control block 201 of the system 200, that is, a test target, at step S110. The system 200 operates normally before the test agent is inserted into the process control block 201.

Next, when an event related to the test target occurs, the inserted test agent hooks the test target to a test code at step S120. When the test target is hooked to the test code, the test code may be executed instead of a process in which the event has occurred.

When the test target is hooked to the test code, pieces of test information about the process in which the event related to the test target has occurred are collected at step S130. The pieces of collected test information are stored at step S140. Here, the pieces of test information may be collected only while the test target is hooked to the test code, or the pieces of test information may be collected while the test target is hooked to the test code and while the system operates after the test target is hooked to the test code.

Figure 4A:
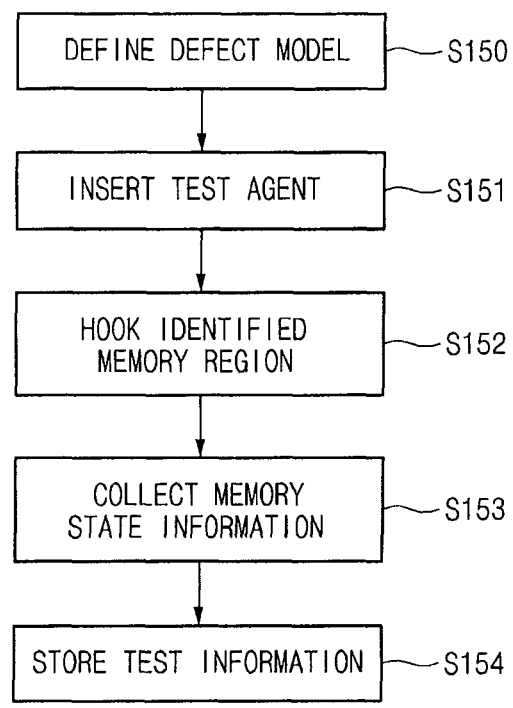
FIGS. 4a to 4c are flowcharts illustrating a memory test method, a performance test method, and a method of testing communication between processes according to embodiments of the present invention.
Figure 4B:
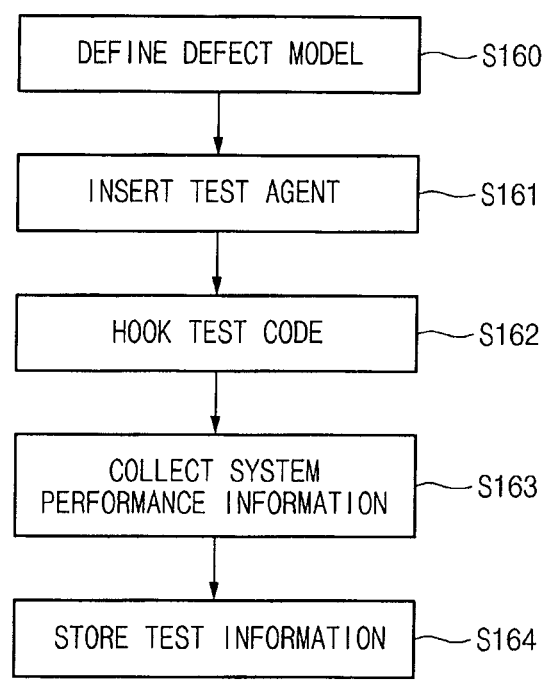
Figure 4C:
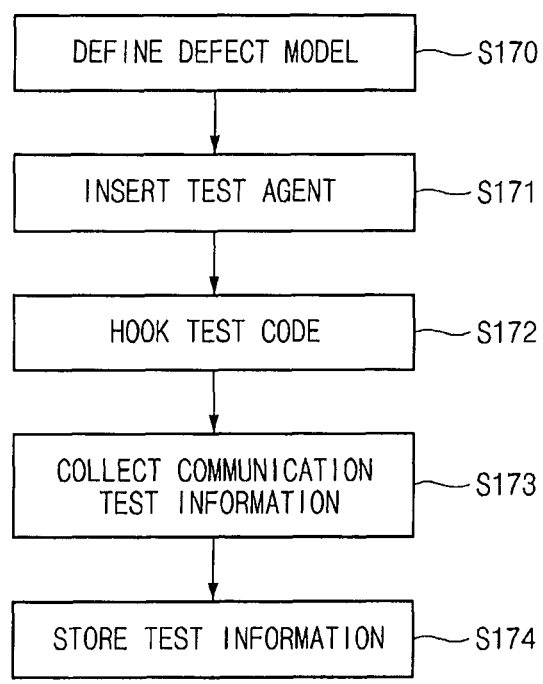

FIGS. 4a to 4c are flowcharts illustrating a memory test method, a performance test method, and a method of testing communication between processes according to embodiments of the present invention.

FIG. 4a shows a system test method for performing a memory defect test. First, a defect model is defined at step S150. The defect model means the position of memory to be detected depending on the type of detect and test information for discovering and recovering the defect. While the system 200 operates normally, a test code capable of collecting pieces of test information may be generated according to the defect model.

Next, a test agent is inserted into the process control block 201 of the system 200 at step S151. The test agent may be inserted into any least one of a list of processes that are operating in the system 200.

Next, the hooking module 103 identifies the region of memory to be hooked based on the defect model and information included in the process control block 201 and hooks a test code to the identified memory region at step S152. If, as a result of the identified memory region, a test position is a system Application Process Interface (API) function, the hooking module 103 identifies the API set of the process control block 201 as a hooking region. If, as a result of the identified memory region, a test position is a Dynamic Linking Library (DLL) export function, the hooking module 103 identifies the Import Address Table (IAT) of the process control block 201 as a hooking region. In other cases, the hooking module 103 identifies the code space of the process control block 201 as a hooking region.

In FIG. 4a, the term 'being hooked to the test code' means that when an event, such as write, read, or access, for the memory occurs at the position of the memory, that is, a test target, within the system 200, the inserted test agent hooks the process control block of an OS so that the test code including the operation of an original code is executed.

Next, pieces of information about the state of the memory, that is, the test target, are collected at step S153. For example, program execution information necessary to identify a cause of a defect, process context information necessary to identify the position of the defect, and system state information necessary to analyze memory performance may be collected.

The pieces of test information collected at step S153 are stored at step S154.

FIG. 4b shows a system test method for performing a performance test. In a system test method according to the present invention, in order to analyze a performance bottleneck and a cause thereof, pieces of system execution information, such as a page fault rate and a processor use rate, from among the data of the process control block 201, may be hooked and the performance of the system may be analyzed based on a result of the hooking.

Here, the term 'performance' means the degree that a system or components perform a function on a condition of a given system. A performance test is an evaluation regarding whether specific performance requirements satisfy a system or not. A performance bottleneck and a cause thereof may be analyzed through the performance test, and the performance of a system can be improved by solving the performance bottleneck and the cause.

The performance bottleneck of a system is a phenomenon in which the performance of the system is deteriorated owing to contention for limited resources, such as memory, I/O devices, and a network. The system performance bottleneck may be various, such as a shortage of resources, contention for shared resources, the exclusive possession of resources, an erroneous configuration of resources, and an erroneous operation of resources.

First, a defect model is defined at step S160. The defect model means the position of a performance bottleneck to be tested depending on the type of detect and test information indicating a system state that will determine a performance bottleneck. While the system 200 operates normally, a test code capable of collecting pieces of test information may be generated according to the defined defect model.

The insertion module 101 inserts a test agent into the process control block 201 at step S161. The insertion module 101 may check a list of processes that are operating in the system 200 and insert the test agent into the process control block 201 based on the check list. That is, the base address of the process control block 201 regarding a current process is managed in a specific memory space or managed as a previously fixed address according to circumstances. Thus, information about the process control block 201 regarding a current process may be known.

The hooking module 103 hooks a test target to a test code at step S162.

When the test target is hooked to the test code, the scanning module 105 collects pieces of information about the performance of the system at step S163. For example, timer-interrupt may be used, and performance data may be measured at a predetermined time interval (e.g., 1 sec or 100 msec). Furthermore, in order to analyze the performance of the system not only for each system, but also for each process or thread, performance information may be measured while circulating lists of processes and threads of the process control block 201.

In order to precisely track a position where a system performance bottleneck occurs, the scanning module 105 may store call-stack information for each thread. Performance information measured for every monitoring is as follows.

The performance information of the process control block 201 may include one or more of a processor usage, a memory usage, a page fault, process context information, process call-stack information, a process heap usage, a process state, and process priority. The performance information of a process of the process control block 201 may include one or more of an ID, the state of a process, process priority, a heap usage, the operating time of a process, a user time, and a kernel time. Furthermore, the performance information of a thread of the process control block 201 may include one or more of an ID, a run state, basic priority, current priority, a user time, a kernel time, and call-stack information.

Next, the logging module 107 stores the pieces of collected test information in the storage space at step S164.

In the system test method for performing a performance test, a memory bottleneck may be determined based on a page fault. For example, if a page fault is high, it may be a memory bottleneck. The page fault is a phenomenon in which a program attempts to access data or a code which exists in its own address space, but does not exist in the memory of a system now. When a page fault occurs, an OS fetches corresponding data to memory so that a program continues to operate as if the page fault has not occurred. The time that an application performs processing is delayed and overall system performance is affected owing to the exception handling of an OS for a page fault.

Furthermore, in the system test method according to the present invention, a performance bottleneck may be determined based on a memory usage. The memory of a system may be classified into a physical memory usage, a virtual memory usage, and a heap memory usage for each process. In the system test method according to the present invention, a performance bottleneck is determined based on the sum of the memory usages.

Furthermore, in the system test method according to the present invention, a performance bottleneck may be determined based on a processor usage (or a CPU usage). For example, in the system test method according to the present invention, if a processor usage remains high and there is available memory, it may be determined that there is a bottleneck in a CPU. In contrast, if a processor usage remains high and memory has been exhausted, it may be determined that a performance problem results in a memory bottleneck rather than a CPU.

Furthermore, in the system test method according to the present invention, a performance bottleneck may be determined based on a process usage. The process usage means the time in which an idle time has been excluded from a total CPU usage owing to the execution time of a system.

Furthermore, in the system test method according to the present invention, a performance bottleneck may be determined based on a user time. The user time means the time that execution remains in a user space, that is, the time that it takes to execute an application.

Furthermore, in the system test method according to the present invention, a performance bottleneck may be determined based on a kernel time. The kernel time means the time that execution remains in a kernel space, that is, the time that the kernel takes to process service.

FIG. 4c shows a system test method for performing a test for communication between plural processes. The system test apparatus 100 that performs the system test method of FIG. 4c may collect pieces of test information about shared resources between all processes included in the system 200 and about whether communication is precisely performed or not.

First, a defect model is defined at step S170. Here, the defect model means a position where communication between processes to be tested depending on the type of detect is performed and test information necessary to discover and recover a defect. While the system 200 operates normally, a test code capable of collecting pieces of test information may be generated according to the defined defect model.

A test agent is inserted into the process control block 201 of the system 200, that is, a test target, at step S171. The insertion module 101 may select two or more of a list of processes as test targets and insert a test agent for testing communication between the selected processes into the process control block 201.

When an event related to communication occurs between plural processes, the inserted test agent hooks the test target to the test code at step S172.

The term 'being hooked to the test code' means that when the event related to communication occurs between the plurality of processes within the system 200 operating now, the inserted test agent hooks the process control block of an OS so that the test code including the operation of an original code is executed. The hooking module 103 may check that any type of an event related to communication occurs based on information included in the process control block 201. Here, the event related to communication means message passing, the transfer of shared data, the use of shared memory, the use of a message queue, and the use of a synchronization object between the plurality of processes.

The test code is used to check the type of detect which is related to message passing, a message queue, shared memory, or a synchronization object between the plurality of processes.

For example, the test code may include a first function, such as SendMessage( ) or PostMessage( ) and a second function that is necessary depending on the type of defect to be tested. The processes included in the system include the first functions, respectively. Accordingly, when an event related to communication occurs between the first process and the second process, the hooking module 103 hooks a test target to a test code in such a manner that an inserted test agent executes the test code instead of the first functions of the first process and the second process in a step in which the first functions are executed in the first process and the second process. The step in which the first functions are executed in the first process and the second process is checked based on information included in the process control block 201.

Meanwhile, since the test target is communication between the plurality of processes, the test code may be hooked in only one of a transmitter and a receiver depending on the type of detect to be tested.

When the test target is hooked, the scanning module 105 collects pieces of test information about communication between the plurality of processes in which the event related to communication has occurred at step S173. Here, the communication between the plurality of processes includes not only an already generated event related to communication, but also an event related to communication which occurs according to the hooking of the test code. The pieces of collected test information may be different depending on a test step, a test object, and the type of detect to be tested.

Accordingly, the scanning module 105 collects pieces of information about the dynamic state of the system that are necessary to determine a defect regarding the communication between the plurality of processes, such as a function parameter and return value, a performance measurement value, and a shared resource use list.

The pieces of test information may include call-stack information about the plurality of processes, the type of communication, communication IDs, and communication data transmitted and received between the plurality of processes, and a delay time occurred in the communication between the plurality of processes.

The logging module 107 stores the pieces of test information, collected by the scanning module 105, in the storage space at step S174. The storage space may be included in the logging module 107 or may be implemented as a device different from the logging module 107. The analysis apparatus 400 of FIG. 1 may analyze the pieces of test information collected by the scanning module 105 or the pieces of test information stored in the logging module 107.

The test code used to perform a test for the communication between the plurality of processes may be a code for checking the type of detect which is related to message passing, a message queue, shared memory, or a synchronization object between the processes.

The type of detect related to the message passing may be classified into a message passing failure (synchronization), a message deadlock (synchronization), message processing delay (synchronization), a message loss (synchronization), a message change (synchronization), a failure in insertion into a message queue (asynchronization), message processing delay (asynchronization), a message loss (asynchronization), and a message change (asynchronization) within a predetermined time.

The type of detect related to the message queue may be classified into a message queue generation failure, a message queue close failure, a failure of read from a message queue, and a failure of write in a message queue.

The type of detect related to the shared memory may be a shared memory generation failure.

The type of detect related to the synchronization object may be classified into the use of a synchronization object not generated, the non-use of a generated synchronization object, and the non-release of a used synchronization object.

Accordingly, the test code is changed depending on the type of detect.

As described above, the system test apparatus 100 according to the present invention can insert a test agent, hook a test code, and collect pieces of test information without affecting the system 200 that is operating. The system test apparatus 100 performs a system test based on information included in the process control block 201 of the system 200.

The present invention may be implemented in a recording medium in the form of a code readable by a processor. The recording medium readable by a processor includes all types of recording devices in which data readable by a processor is stored. The recording medium may include, for example, ROM, RAM, CD-ROM, magnetic tapes, floppy disks, and optical data storages. Furthermore, the recording medium readable by a processor may be distributed over computer systems connected over a network, and the code readable by a processor may be stored and executed in a distributed manner.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention can test a memory error, system performance, and communication between processes while a system operates actually.

The invention claimed is:

1. A system test apparatus for a system comprising a plurality of processes and a process control block including run-time execution information about the plurality of processes during run-time conditions of the system, the system test apparatus comprising:
    an insertion module configured to insert a test agent into the process control block based on a list of processes that are operating in the system while the system operates;
    a hooking module configured to hook a test target to a test code in such a manner that the test agent executes the test code including an operation of an original code instead of functions of the plurality of processes, when an event related to the test target occurs among the plurality of processes;
    a scanning module configured to collect pieces of test information about a process in which the event related to the test target has occurred when the test target is hooked to the test code;
    a logging module configured to store the pieces of test information collected by the scanning module; and
    an analysis apparatus configured to analyze the pieces of collected test information.

2. The system test apparatus of claim 1, wherein the process control block comprises at least one of a present state of resource use, a process state, order of priority, and a function table for the plurality of processes.

3. The system test apparatus of claim 2, wherein the test code is defined depending on a type of defect.

4. The system test apparatus of claim 3, wherein the hooking module identifies a memory region based on a test position according to the type of defect and hooks the identified memory region to the test code.

5. The system test apparatus of claim 3, wherein the test information comprises at least one of program execution information, process context information, and system state information.

6. The system test apparatus of claim 2, wherein the scanning module measures information about a performance of the process control block.

7. The system test apparatus of claim 6, wherein the information about the performance of the process control block comprises at least one of a processor usage, a memory usage, a page fault, process context information, process call-stack information, a process heap usage, a process state, and process priority.

8. The system test apparatus of claim 6, wherein the scanning module measures the information about the performance of the process control block at a predetermined time interval.

9. The system test apparatus of claim 6, wherein the scanning module measures information about a process and thread of the process control block.

10. The system test apparatus of claim 9, wherein performance factors for the process of the process control block comprise one or more of an ID, a state of the process, priority of the process, a heap usage, operating time of the process, a user time, and a kernel time.

11. The system test apparatus of claim 9, wherein performance factors for the thread of the process control block comprise one or more of an ID, a run state, basic priority, current priority, a user time, a kernel time, and call-stack.

12. The system test apparatus of claim 2, wherein the event related to the test target comprises at least one of message passing, a transfer of shared data, a use of shared memory, a use of a message queue, and a use of a synchronization object between the plurality of processes.

13. The system test apparatus of claim 12, wherein the test code is a code for checking the type of defect regarding at least one of the message passing, the message queue, the shared memory, and the synchronization object between the plurality of processes.

14. The system test apparatus of claim 12, wherein the pieces of test information comprise at least one of call-stack information about the plurality of processes, a type of communication, communication IDs, and communication data transmitted and received between the plurality of processes, and a delay time occurred in communication between the plurality of processes.

15. The system test apparatus of claim 12, wherein the pieces of test information comprise pieces of information about a dynamic state of the system, information about a process state, and information about communication between the plurality of processes.

16. A system test system for a system comprising a plurality of processes and a process control block including run-time execution information about the plurality of processes during run-time conditions of the system, the system test system comprising:
    an input apparatus configured to receive a signal for driving the system;
    a system test apparatus configured to insert a test agent into the process control block based on a list of processes that are operating in the system while the system operates, hook a test target to a test code in such a manner that the test agent executes the test code including an operation of an original code instead of functions of the plurality of processes when an event related to the test target occurs among the plurality of processes, and collect pieces of test information about a process in which an event related to the test target has occurred, from among the plurality of processes, while the system operates in response to the signal received through the input apparatus; and an analysis apparatus configured to analyze the pieces of test information collected by the system test apparatus.

17. The system test system of claim 16, wherein the process control block comprises at least one of a present state of resource use, a process state, order of priority, and a function table for the plurality of processes.

18. The system test system of claim 16, wherein a test position where the test code is hooked is changeable depending on a type of defect.

19. The system test system of claim 16, wherein the pieces of test information comprise at least one of program execution information, process context information, system state information, a processor usage, a memory usage, a page fault, call-stack information about the plurality of processes, a type of communication, communication IDs, and communication data transmitted and received between the plurality of processes, and a delay time occurred in communication between the plurality of processes.

20. The system test system of claim 16, further comprising an output apparatus configured to output a result of the test, analyzed by the analysis apparatus, in a form of an image or voice.

* * * * *